Figure 1:
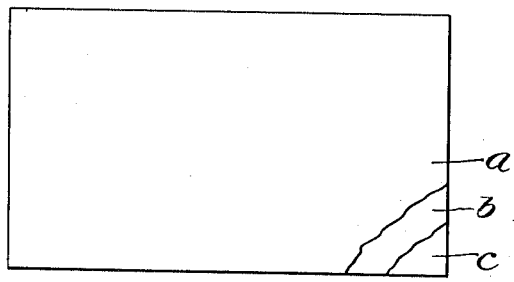

R. FISCHER.
PROCESS OF MAKING PHOTOGRAPHS IN NATURAL COLORS.
APPLICATION FILED JULY 1, 1912.

1,055,155.  Patented Mar. 4, 1913.

WITNESSES
Fenton S. Belt
Albert B. Hall

INVENTOR
Rudolf Fischer
Alexander Lowe Attorneys

UNITED STATES PATENT OFFICE.

RUDOLF FISCHER, OF STEGLITZ, NEAR BERLIN, GERMANY.

PROCESS OF MAKING PHOTOGRAPHS IN NATURAL COLORS.

1,055,155.  Specification of Letters Patent.  Patented Mar. 4, 1913.

Application filed July 1, 1912. Serial No. 707,084.

*To all whom it may concern:*

Be it known that I, RUDOLF FISCHER, a citizen of the Empire of Germany, and residing at Steglitz, near Berlin, Germany, have invented a certain new and useful Improved Process of Making Photographs in Natural Colors, of which the following is a specification.

My invention relates to processes of making photographs in natural colors.

It is well known that by bathing exposed films of halogen-silver in suitable solutions monochrome pictures can be directly obtained, the exposed halogen-silver oxidizing the substance in the solutions to an insoluble coloring-matter which is precipitated on the reduced silver. Hereinafter this mode of development will be termed "color development," and the substances causing the same "color formers".

In the process according to my invention I utilize this stronger oxidation capacity of exposed halogen-silver as compared with that of unexposed for producing colored photographs. I can do this in various ways, and both additive as well as subtractive colored pictures can be produced equally well.

I. For example, to make an additive colored picture, I expose a halogen-silver layer sensitive to light under a screen, one-third of whose surface is permeable to light while two-thirds thereof are covered, then bathe the layer in a solution, e. g. indoxyl, producing a blue coloring-matter, then expose it under a second screen, one-third of the surface being again exposed, and then bathe it in a solution, e. g. thioindoxyl, producing a red coloring-matter. I then expose the whole surface without the screen-negative, the remaining or previously unexposed halogen-silver being influenced and colored green when bathed in a solution, e. g. chlorid of indoxyl, producing a green coloring-matter. During the second and third exposures the reduced silver and the particles of such coloring matter protect the unchanged halogen-silver below it from further exposure and development. Moreover, this protection can be afforded by the coloring-matter already formed, by using during the subsequent exposures a light which is absorbed by the existing coloring-matter. The reduced silver is then removed with e. g. Farmer's reducing solution and the unchanged halogen-silver with a fixing agent.

II. For subtractive pictures I employ, as usual, three part-negatives, each of which corresponds to one of the primary colors. From these negatives three part-positives are produced on halogen-silver layers, then developed as above described with the corresponding color-formers, and finally placed one above another. The part-positives can also be obtained directly from a complementary-colored negative produced by means of screens by making positive part-extracts from the negative either using filters and copying on a panchromatic halogen-silver layer, or without filters and copying on selectively-sensitized halogen-silver layers. These positives are developed colored and superposed one on another as described above.

The last described process of reproduction on three selectively-sensitized halogen-silver emulsions can be carried out in one operation in the following manner:—Three emulsions are made, one being sensitive only to blue, another only to green and a third only to red. In these emulsions are incorporated the substances necessary for the formation of each color, i. e. the substances termed "color formers," the latter being so selected, for example, that that color is formed at any time which is complementary to the corresponding selective color-sensitization of the halogen-silver. Now when these three emulsions are poured out in three layers one on another, there is formed, e. g. under the action of blue light, a yellow color, and at the places acted on by red or green light the corresponding complementary colors. When the colors are correctly chosen those places which white light strikes become nearly black, while at those whereon no light strikes, (i. e. under the covered parts of the negative), no coloration is formed at all, and consequently after fixing white results. By copying a complementary-colored negative on such a layer the correct colors and correct black-white values are obtained. As such superposed layers are very thin they will actually stop only light rays of their own color.

Instead of pouring the three above emulsions in three layers one on another, before pouring them I may treat them in a suitable manner, e. g. by tanning, so that they can be mixed without the three complexes (halogen-silver and color-formers) uniting to form one homogeneous layer or film; this treatment has heretofore been proposed for a theoretically developed process of color photography. (*Photographische Rundschau* 1911, page 2.)

The halogen-silver which is unchanged during the copying operation and the silver formed simultaneously with the coloring-matter are removed by fixing and reducing agents.

When practising the process with three layers I may use a yellow coloring-matter mixed with a binder as an intermediate layer for the purpose of reducing the sensitiveness to blue in the layers of halogen-silver sensitive to green and red. It is, moreover, preferable not to pour the three films directly one on another, but to interpose a colorless layer in order to prevent diffusion of the color-producing substances.

Example: With a complementary-colored screen-negative an exposure is made through a blue-filter on a transferable panchromatic layer of halogen-silver. The exposed picture is developed with pyrogallol, fixed, and the silver removed with Farmer's reducing agent. This yellow part-picture is now drawn off and transferred to a suitable backing. An exposure is then made with a green filter on a similar layer and a purple-red picture developed in the following developer: 0.5 g. thioindoxyl carboxylic acid, 5 c. cms. acetone, 5 g. potash, and 100 c. cms. water. After fixing and removing the silver, this red picture is transferred to the yellow one. Finally, by using a red filter an exposure is made on a panchromatic layer and this is developed in the following developer: 0.5 g. indoxyl carboxylic acid, 5 c. cms. acetone, 2 g. potash, 100 c. cms. water. After the removal of the silver and halogen-silver this picture is transferred to the two former pictures.

Figure 2:
Figure 3:
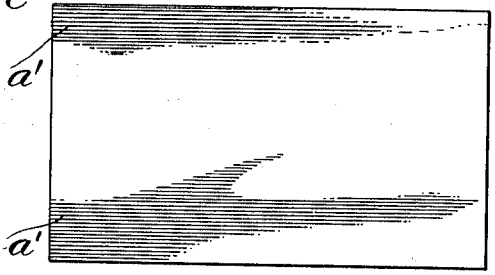
Figure 4:
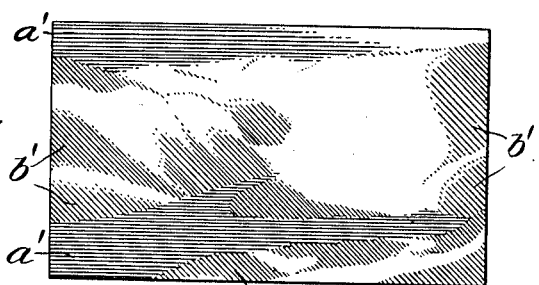
Figure 5:
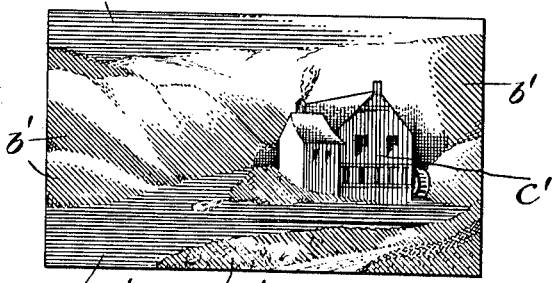

In the accompanying drawings—Figure 1 is a plan view of an undeveloped plate or film indicating the several layers of emulsion. Fig. 2 is a magnified edge view of such a plate. Figs. 3, 4 and 5 show the several steps of the development of the picture by successive exposures of the prepared plate.

In the drawings the different layers of emulsions are indicated in Figs. 1 and 2 by the letters $a$, $b$ and $c$. $a$ being the blue emulsion; $b$ the green; and $c$ the red emulsion. The blue layer $a$ is developed with pyrogallol; the green one $b$ with thioindoxyl carboxylic acid; and the red layer $c$ with indoxyl carboxylic acid.

Fig. 3 shows at $a'$ the effect of exposure of the blue layer $a$. Fig. 4 shows at $b'$ the effect of exposing the green layer $b$ by a second exposure of the plate; and Fig. 5 shows at $c'$ how the red layer $c$ has been developed by a third exposure; and it also shows the completed photograph.

I claim:—

1. The herein described process of making colored photographs consisting in producing the various primary colors on an exposed halogen-silver film by developing such film by means of such substances as are oxidized by exposed halogen-silver to colored substances soluble with difficulty.

2. A process of making colored photographs consisting in producing the various primary colors by color development of the exposed halogen-silver by means of such substances as are oxidized by exposed halogen-silver to colored substances soluble with difficulty, the selective, color-sensitive, halogen-silver emulsions mixed with the corresponding color-formers being applied in three layers one on another.

In testimony whereof, I affix my signature in the presence of two witnesses.

RUDOLF FISCHER

Witnesses:
 WOLDEMAR HAUPT,
 HENRY HASPER.